Oct. 11, 1966     J. DURST     3,277,775
TRANSPARENCY HOLDER FOR PHOTOGRAPHIC ENLARGING DEVICES
Filed Aug. 12, 1963
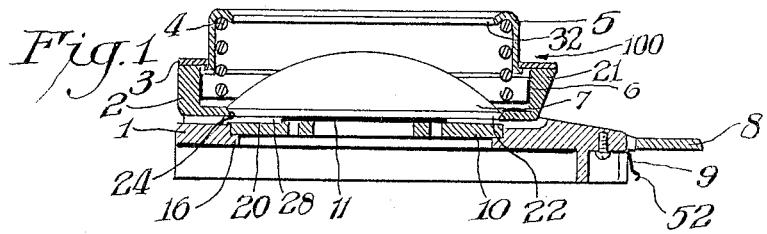
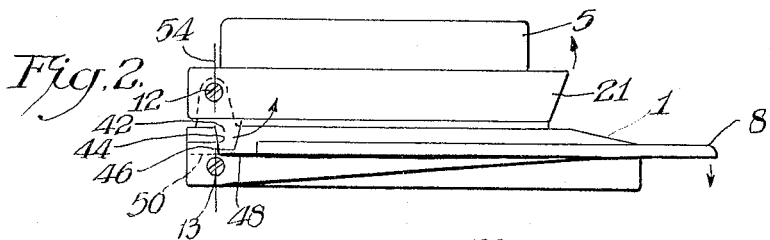
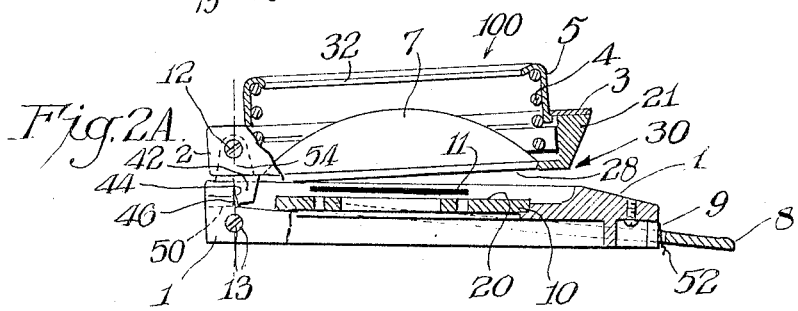
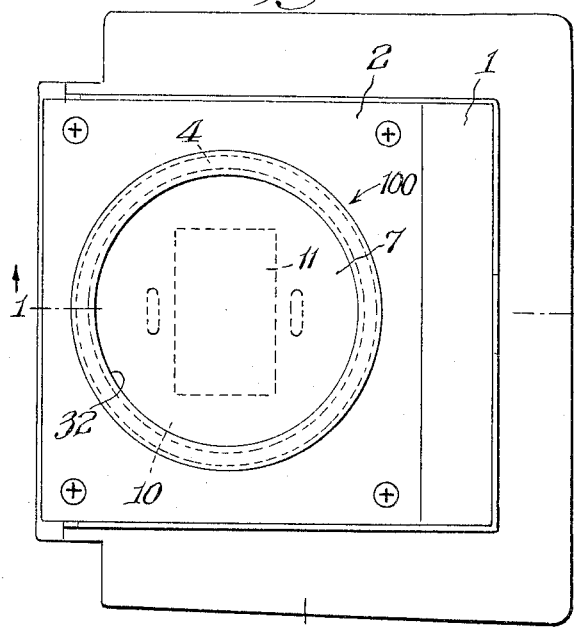
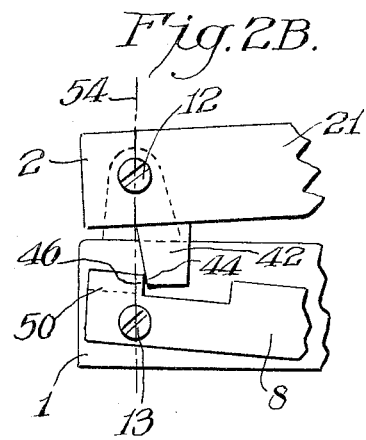
INVENTOR
Julius Durst > United States Patent Office 3,277,775
Patented Oct. 11, 1966

3,277,775
TRANSPARENCY HOLDER FOR PHOTOGRAPHIC ENLARGING DEVICES
Julius Durst, Brixen, near Bozen, Italy, assignor to Durst A.G. Fabrik Fototechnischer Apparate, Bolzano-Bozen, Italy
Filed Aug. 12, 1963, Ser. No. 301,242
Claims priority, application Italy, Dec. 11, 1962, 24,432
4 Claims. (Cl. 88—24)

This invention relates to a convenient, manually-operated transparency holder for photographic enlarging devices, and more particularly to such a holder which applies flattening pressure to a transparency inserted within it.

In order to insert a transparency such as negative or positive into an enlarging apparatus, it is first necessary to open the holder. After insertion, the holder is closed to press a glass element, which might be part of a condenser lens, against the transparency to hold it flat. Some existing holders employ a lever positioned above or below their access openings for opening and closing the pressure applying means. This frequently requires a provision of two and even three handles which must be operated before and after manipulation of the transparency.

An object of this invention is to provide a simple, economical and yet a dependable transparency holder for a photographic enlarger, which has relatively few parts.

Another object of this invention is to provide such a holder which can be conveniently operated while the transparency is manipulated.

In accordance with this invention an operating lever for a transparency holder of a photographic enlarger is mounted adjacent the access opening of the holder to permit it to be conveniently depressed by the operator's hands while they are inserting or withdrawing the transparency, thereby simultaneously lifting the pressure applying assembly. When the transparency is released and the hands removed, the operating lever is automatically released and the pressure applying assembly closes. The operating lever is depressed below the access opening and transparency supporting surface to provide unobstructed access for positioning a transparency within the holder by extending the hands from the top of the operating lever that they are simultaneously depressing. The operating lever accordingly may be positioned in front of the access opening to prevent introduction or withdrawal of a transparency until the lever is depressed out of the way of the opening and the pressure applying assembly automatically raised. The operating lever may be extended about the periphery of the base to increase the availability of its operating area, and it may preferably extend about the front and both sides of the holder to permit its operation from any one of these directions.

In an advantageous form of the holder of this invention the pressure applying assembly and operating lever are hinged to the rear of the transparency supporting base above and below the junction between the pressure applying assembly and base respectively. A pair of mutually contacting surfaces between the lever and pressure applying assembly cause the downward motion of the lever to raise the pressure applying assembly and thereby open the holder. A spring may react between the lever and base to help raise the lever when released and to help quickly and positively close the holder.

Novel features and advantages of the present invention will become apparent to one skilled in the art from a reading of the following description in conjunction with the accompanying drawings wherein similar reference characters refer to similar parts and in which:

FIG. 1 is a cross sectional view in elevation of one embodiment of this invention taken through FIG. 3 along line 1—1;

FIG. 2 is a side view in elevation of the transparency holder shown in FIG. 1 in a closed position;

FIG. 2A is a fragmentary cross sectional view in elevation of the embodiment shown in FIGS. 1 and 2 in an opened position;

FIG. 2B is an enlarged view of a portion of the embodiment shown in FIG. 2A; and FIG. 3 is a top plan view of the embodiment shown in FIG. 1.

In FIG. 1 is shown a transparency holder 100 for a photographic enlarger (not shown) including a base or main body 1 having a flat transparency supporting plate 10 and a transparent section such as central aperture 16. Apertured transparency plate 10 has a flat upper surface 20 upon which the transparency or negative 11 is placed. Attached to and above base 1 at one end thereof by means of a hinge connection 12 is a pressure applying assembly 21 having a central aperture 22 disposed coaxially above base aperture 16. A pressure applying transparent element such as a condenser lens component 7 is mounted within assembly 21, and its bottom 28 is flat to cooperate with the flat surface 20 of supporting plate 10 in holding transparency 11 flat. Assembly aperture 22 and transparent element 7 constitute a transparent section of the assembly which is substantially aligned with the transparent section of the base for the transmission of light through the holder. Lens 7 is loosely positioned in cooperatively beveled opening 24 in mounting ring 2. Coiled compression spring 4 reacts between flange 32 of cylindrical spring retainer 5 and lens retaining ring 6 to provide resiliently adjustable mounting for lens 7. Securing ring 3 attaches spring retaining housing 5 to assembly 21.

Operating lever 8 is connected to the rear of base 1 by pivots 13 disposed under hinges or pivots 12 which rotatably support pressure applying assembly 21. Operating lever 8 is advantageously U-shaped to provide an ample operating surface that is accessible from the sides or front of the holder which can be depressed by pressure applied at any one point.

Mutually contacting surfaces 44 and 46 are provided between projections 42 and 50 from assembly 21 and operating lever 8 respectively, and disposed for example along an imaginary line 54 between the axes of rotation of pivots 12 and 13. Projection 42 from assembly 21 is for example tapered like a gear tooth, and projection 50 from operating lever 8 also resembles a single gear tooth. Projection 42 extends within a recess 48 in operating lever 8 into contact with projection 50. FIG. 2 shows how rotation of operating lever 8 in a downward or clockwise direction causes rotation of pressure applying housing 21 in an upward or counterclockwise direction. The interaction between projections 42 and 50 is accordingly similar to that of two gears, each having only one tooth.

A leaf spring 9 is attached to base 1, and it includes an inclined tail disposed within the path of motion of the inside surface of operating lever 8 for biasing operating lever 8 upwardly to close holder 100 in conjunction with the weight of assembly 21 when lever 8 is released. Projection 52 at the end of spring 9 wedges between the inside of lever 8 and base 1 to provide a lower limit of travel for lever 8.

Holder 100 is accordingly easily opened while a transparency such as a negative or positive is being inserted by resting parts of the hands manipulating the transparency upon the operating lever and pressing downwardly upon it. This causes operating lever 8 and its projection 50 to rotate in a clockwise direction which rotates mutually contacting projection 42 counterclockwise, thereby opening access opening 30 (shown in FIG. 2A) to allow the insertion of transparency 11 within holder 100. Upon release of the transparency 11 and subsequent removal of the user's hands from the operating lever 8, holder 100 simultaneously is quickly closed by the action of the leaf spring 9 in conjunction with the weight of assembly 21. The converse is performed for withdrawal of the transparency. Holder 100 accordingly is easily opened and closed without substantially deviating from the motions required to insert, manipulate and withdraw a transparency from it.

What is claimed is:

1. A transparency holder for a photographic enlarging device comprising a base having a flat upper surface, a pressure applying assembly, movable means connecting said pressure applying assembly to said base for relative movement of said assembly with respect to said base, said assembly having a flat lower surface for cooperation with the flat upper surface of said base to hold a transparency flat therebetween, the junction of said flat surfaces constituting an access opening for said transparency, a section of said base being transparent, a section of said assembly being transparent, said transparent sections being substantially aligned with each other for the transmission of light through said holder, an operating lever including handle means and actuating means, pivot means connecting said operating lever to said base, said handle means being disposed adjacent said access opening, said actuating means contacting said assembly for moving said assembly in response to movement of said operating lever whereby a user's hands when manipulating said transparency are in position for simultaneously operating said lever, and said handle means being at the same level as said access opening whereby depression of said handle means removes said operating lever from the vicinity of said access opening so that said access opening is unobstructed during manipulation of said transparency.

2. A transparency holder as set forth in claim 1 wherein said handle means is U-shaped, whereby said handle means may be operated from any point thereon along three sides of said access opening.

3. A transparency holder for a photographic enlarging device comprising a base having a flat upper surface, a pressure applying assembly, movable means connecting said pressure applying assembly to said base for relative movement of said assembly with respect to said base, said assembly having a flat lower surface for cooperation with the flat upper surface of said base to hold a transparency flat therebetween, the junction of said flat surfaces constituting an access opening for said transparency, a section of said base being transparent, a section of said assembly being transparent, said transparent sections being substantially aligned with each other for the transmission of light through said holder, an operating lever including handle means and actuating means, pivot means connecting said operating lever to said base, said handle means being disposed adjacent said access opening, said actuating means contacting said assembly for moving said assembly in response to movement of said operating lever whereby a user's hands when manipulating said transparency are in position for simultaneously operating said lever, said movable means being an upper pivot means and said aforementioned pivot means accordingly constitutes a lower pivot means, each of said pivot means having an axis of rotation, said assembly including a downwardly extending projection disposed below said upper pivot means, said actuating means comprising an upwardly extending projection disposed above said lower pivot means, said projections including mutually contacting surfaces that contact each other substantially along an imaginary line passing through said axes for causing downward motion of said lever to rotate said pressure applying assembly upwardly.

4. A transparency holder as set forth in claim 3 wherein said handle means is at the same level as said access opening whereby depression of said handle means removes said operating lever from the vicinity of said access opening so that said access opening is unobstructed during manipulation of said transparency, said handle means being U-shaped, resilient means reacting between said base and said operating lever for resiliently biasing said operating lever upwardly, and said resilient means comprising a leaf spring having one end secured to said base and having a tail disposed under said operating lever and in its path of motion for resiliently biasing said operating lever upwardly.

References Cited by the Examiner

UNITED STATES PATENTS 2,266,908 12/1941 Rogers _____ 88—24

FOREIGN PATENTS 809,370 7/1951 Germany.

NORTON ANSHER, *Primary Examiner.*

R. A. WINTERCORN, *Assistant Examiner.*